G. RENNERFELT.
ROLLER BEARING.
APPLICATION FILED MAY 13, 1907.
977,128.
Patented Nov. 29, 1910.
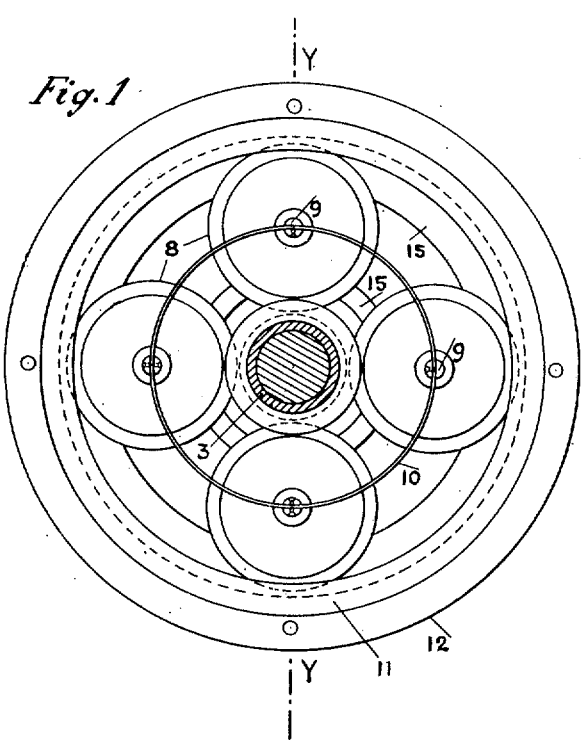
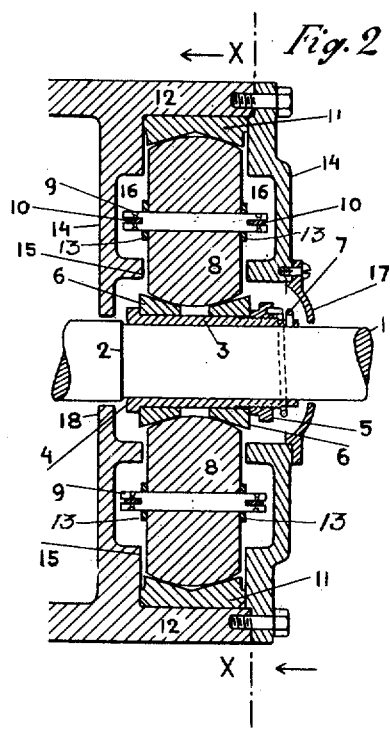
WITNESSES
INVENTOR
Gustaf Rennerfelt

UNITED STATES PATENT OFFICE.

GUSTAF RENNERFELT, OF SCRANTON, PENNSYLVANIA.

ROLLER-BEARING.

977,128.  Specification of Letters Patent.  Patented Nov. 29, 1910.

Application filed May 13, 1907. Serial No. 373,358.

*To all whom it may concern:*

Be it known that I, GUSTAF RENNERFELT, a subject of the King of Sweden, and a resident of Scranton, in the county of Lackawanna and State of Pennsylvania, United States of America, have invented certain new and useful Improvements in Roller-Bearings, of which the following is a specification.

My invention relates to improvements in roller bearings, and its object is to provide a bearing of this class which is simple and cheap in construction and efficient in operation.

I will describe my invention in the following specification and point out the novel features thereof in claims.

Referring to the drawing, Figure 1 is a sectional end elevation of a roller bearing constructed according to my invention, the section being taken through the line X—X of Fig. 2, and the view taken in the direction of the arrows. Fig. 2 is a sectional side elevation of the bearing, the section being taken on the line Y—Y of Fig. 1.

Like characters of reference designate corresponding parts in both of the figures.

1 designates a shaft or journal to which my bearing is applied; 2 a shoulder sometimes used on the shaft; 3 a sleeve mounted on the shaft and arranged to rotate therewith. One end of the sleeve is formed with a head 4; the other end is threaded so as to form a screw to which a nut 5 is applied.

6, 6 designate two bushings similar to one another, mounted on the sleeve between the head and the nut, so that the distance between the two bushings may be adjusted by means of the nut. These bushings are oppositely beveled and are hollow, being provided with smooth cylindrical bores without keyseats. Each of the bushings is constructed to form the frustum of a cone, the apex of which is located on the center line of the shaft.

7 designates a torsional spring coiled around the sleeve, and fastened with its ends between the nut and the end of the sleeve. By turning the nut on the threaded part of the sleeve the distance between the bushings may be regulated, so that the distance between the shaft and rollers is adjusted, or the initial pressure between the rollers and the bushings may be varied. By this means undue play or looseness in the bearing, caused by wear or by inaccurate workmanship, can be obviated. The spring 7 serves to lock the nut to the sleeve; the said spring may also be considered as means for automatically turning the nut in such direction as to tighten the nut against the bushing 6.

8, 8 designates a plurality of rollers, preferably four in number, formed with flat ends and with convex faces, their curvature being preferably spherical so that each roller constitutes an equatorial section of a sphere.

9, 9 designate studs passing through the rollers, and 10, 10 continuous rings, which may be flexible, one on each side of the rollers connecting the ends of the studs, and serving to maintain the distance between the rollers. The rings are carried by or fastened to the ends of the studs, which serve as the sole means for supporting the rings. Washers 13 are placed on the studs to prevent rubbing between the rollers and the rings.

11 designates a track for the rollers, surrounding and in contact with the rollers. The track is formed with two oppositely beveled faces, each face constituting the frustum of a cone of which the apex is located on the center line of the shaft, and of which the top angle is equal to the top angle of the conical bushings 6.

12 designates a casing which surrounds and supports the track, and may be considered as a part of the track.

14, 14 are plates fastened to the casing, one on each side of the track, and formed with annular flanges 15, arranged in close proximity to the ends of the rollers, to limit the deviation of any roller from parallelism with the shaft. Chambers 16, 16 are formed in the side-plates between the flanges to provide clearance for the ends of the studs and their connecting rings.

17 designates a cap screwed to one of the side-plates and serving to protect the bearing from dust; by removing the cap access to the bearing is obtained, so that the distance between the bushings may be adjusted.

18 designates a lip formed integrally with the other side plate, and extending close to the shaft, so as to protect the bearing from dust. The clearance between the shaft and the lip 18, or the cap 17, can be held very small by reason of the absence of undue slack or play between the rollers, bushings and track, and the small magnitude of said clearance will serve as efficient dust protection.

Any pressure applied to the spherical face of the roller is directed through its center so that these rollers are adapted to sustain pressure both in radial and axial directions. The form of the conical bushings and track upon which the rollers run aids in this function in sustaining and resisting pressure in an axial direction.

In a roller bearing comprising any number of rollers the total pressure from the shaft may at some time come upon one single roller. I prefer to use four rollers as shown, since the use of three rollers would cause a greater maximum pressure to come upon any one of the rollers, and more than four rollers would involve needless complication of the structure without decreasing the pressure on the rollers. The form of the rollers which I use is such that they can be produced at moderate cost of any large size required to sustain heavy pressure, and that the axial length of the bearing can be much shorter than if the whole ball were used instead of only its middle section.

One of the purposes of this invention is to supply a bearing which shall have the advantages of both roller bearings and ball bearings and especially to produce a bearing of convenient shape and size which shall be as effective and perform the same function as would a ball bearing using extremely large balls. In other words, the hereindescribed bearing has the efficiency and effectiveness of a ball bearing with balls of such large diameter that their construction would be practically prohibitive.

I am aware that a ball bearing has heretofore been devised which is provided with two oppositely disposed bushings adjustable relatively toward each other on a shaft or sleeve, and a track between which adjustable bushings and the track the balls are situated. I am also aware that a ball bearing has heretofore been devised which embraces a bushing, a surrounding track and a series of disks having spherical faces and held in place by studs located at relatively equal distances apart and combined with loose balls arranged to sustain the entire load, one between each pair of disks, which disks carry no load but serve as spacers only, and I make no claim hereinafter broad enough to include either of the structures above referred to.

What I claim is:

1. In a roller bearing, the combination of a shaft, a track, a plurality of rollers arranged to sustain all axial and radial pressure between the shaft and the track, said rollers having flat ends and spherical faces, a plate fastened to the track in close proximity to the flat ends of the rollers and arranged to limit the deviation in parallelism between the rollers and the shaft, and a continuous ring arranged to maintain the distance between the rollers, the side plate being formed with a chamber to provide a clearance for the ring, the diameter of each roller being greater than its length.

2. In a roller bearing, the combination with a shaft, a track, a plurality of rollers arranged to sustain all pressure between the shaft and the track, said rollers having flat ends and spherical faces, means for adjusting the bearing, plates fastened to the track in close proximity to the flat ends of the rollers and arranged to limit deviation in parallelism between the rollers and the shaft, and a pair of continuous flexible rings arranged to maintain the distance between the rollers, the side plates being formed with a chamber to provide a clearance for the ring.

3. The combination of a shaft, a pair of oppositely beveled bushings thereon, a track, four rollers having flat sides and spherical faces in contact with the bushings and with the track, a flexible ring connecting the rollers together and maintaining the distance between them, and washers between said ring and the rollers.

In testimony whereof I have signed my name to this specification, in the presence of two subscribing witnesses.

GUSTAF RENNERFELT.

Witnesses:
   VERNA HALLOCK,
   AARON V. BOWER.